Patented Feb. 28, 1933

1,899,535

UNITED STATES PATENT OFFICE

MERWYN C. TEAGUE, OF JACKSON HEIGHTS, NEW YORK, ASSIGNOR TO GENERAL RUBBER COMPANY, OF NEW YORK, N. Y., A CORPORATION OF NEW JERSEY

PROCESS AND COMPOSITION FOR RUBBERIZING WATER REPELLENT MATERIAL AND PRODUCT THEREOF

No Drawing. Original application filed April 1, 1925, Serial No. 20,010. Divided and this application filed August 18, 1927, Serial No. 213,966. Renewed August 5, 1932.

This invention relates to the manufacture of rubberized material and to new and improved compositions for such manufacture.

This application is a division of my copending application Serial No. 20,010, filed April 1, 1925.

It has been difficult to apply rubber in dispersion either as rubber latex or as artificial aqueous dispersions of rubber directly to materials which are repellent to water, the reason being that a satisfactory penetration is not obtained. This invention aims primarily to overcome this difficulty and to facilitate the close contact of rubber in dispersion with materials which are water repellent or non-adsorptive by nature or as the result of some process, with an agent which wets the same, generically termed an organic polar compound or wetting agent. The invention also aims to enable the rubber to be more or less uniformly applied to associations of such water repellent materials, such as crushed stone, concrete, pebbles, cork, wood, associations of fibres—which may be woven or knitted or stranded or simply matted or felted. It also aims to enable rubber to be applied with more or less rapidity depending upon the polar compound selected, whereby the rate of penetration can be controlled and to govern more or less the quantity of rubber distributed as a binder in and on the desired materials. In the case of crushed stone, concrete, cork, and similar non-fibrous water repellent materials, or materials not easily wet by water, the action of the polar compounds is believed to be that of facilitating the wetting. In the case of fibrous material, such as cotton, hemp, jute, manila fibre, sisal, whether manufactured into articles or unassociated, lack of the property of being wet by water is occasioned by the presence of oils, greases or waxes in or on the individual fibres. These are some of the advantages of the invention, and other advantages will be apparent, from the specification following, to one skilled in the art.

With the preferred embodiment in mind but without intention to limit its scope more than is required by the prior art, the invention may be briefly described as consisting in treating water repellent materials with a polar compound or wetting agent and a dispersion of rubber, with or without vulcanizing and/or filling ingredients as may be desired, the polar compounds being capable of application to the water repellent material either before or simultaneously with the aqueous dispersion of rubber. Preferably the polar compound is incorporated in the aqueous dispersion of rubber, (either natural or artificial) before application to the water repellent material. More specifically the invention relates to treating an association of fibres with a polar compound and a dispersion of rubber which may or may not contain vulcanizing and/or filling ingredients.

It has been found that a great variety of agents designated generically as organic polar compounds may be employed as media for initially wetting water repellent or non-absorbent materials such as stone, concrete, cork, fibres, such as cotton, hemp, wool, hair, asbestos—in fact any mineral, animal or vegetable fibre which contains in or on its fibres oils, waxes or greases or other substances capable of preventing or retarding aqueous dispersions of rubber from penetrating or saturating the material. And some of these polar compounds are better suited for particular materials than are others. Hence it is to be understood at the outset that the invention is broad in scope and is not limited to the use of a particular polar compound as one or another may be selected to meet the requirements of the material to be treated and to obtain the desired product.

According to the invention sulphonated castor oil, sulphonated cotton seed oil, sulphonated olive oil, sulphonated arachis oil, ortho toluidine, sodium sulphanilite, sodium salicylate, thiourea, ammonium (linolenate and isolinolenate) saponin, sodium dioxynaphthalene disulphonate, potassium oleate, sodium naphthalene sulphonate or other related compounds having similar properties may each be employed as the wetting agent and applied to a water-repellent material or to any association thereof, either preliminarily before the aqueous dispersion of rubber or they may be and preferably are mixed with the aqueous dispersion of rubber. While the proportions or quantities of the polar compounds or wetting agents employed may be varied, it has been found that 5 parts on 100 parts of rubber generally yield satisfactory results. The aqueous dispersion of rubber may be prepared artificially but for some purposes it is deemed more desirable to employ rubber latex either as found naturally or diluted or concentrated depending upon the quantity of rubber it is desired to incorporate in the finished material. The aqueous dispersion of rubber may or may not contain vulcanizing or filling ingredients or both. If vulcanizing ingredients are employed of course the rubberized material should be subjected to suitable treatment for effecting vulcanization. The above-named polar compounds or wetting agents are merely given by way of illustration, there being many other substances having a similar capacity for wetting water-repellent fibres at various speeds or time rates and facilitating the penetration therewith of aqueous dispersions of rubber and the ultimate binding together or coating of the water-repellent materials with the rubber. And all substances having such a capacity are intended to be comprehended within the broad invention. While as before stated the polar compounds or wetting agents may be applied to the materials initially (before the latex or other aqueous dispersion of rubber), it is deemed more desirable, as the invention is understood at present, to mix them with the aqueous dispersion of rubber and apply the mixture or composition to the materials in one operation.

It is believed that the mixture of the wetting agents and rubber latex or other aqueous dispersion of rubber when applied to the water-repellent materials efficiently carries the rubber in and onto the materials because of an orientation of the molecules of the wetting agent and of the greater affinity of the hydrocarbon portion of the molecules for the water-repellent materials. Apparently the organic polar compounds wet the materials and prepare the way for the ready ingress or contact of the aqueous dispersion of rubber. The water carrier of the particles of rubber follows the polar compound to or into the mass with greater or less rapidity depending upon the particular polar compound employed, and ultimately results in a uniform coating or deposit of rubber in, on or among the materials.

The following empirical test indicates the speed or rapidity with which various organic polar compounds penetrate an association of fibres. A test of more or less arbitrary character was conducted by applying a mixture consisting of 5 grams of each of the polar compounds indicated and 100 grams of rubber in the form of latex containing 33% solids. Two (2) cc. of each of the thus prepared compositions were accurately measured and placed on a given paper felt and the time required for this liquid to completely penetrate into and be absorbed by the felt was noted. The results were as follows:

| 100 rubber as latex: | Minutes |
|---|---|
| 5 sulphonated castor oil | 0.75 |
| 5 ortho toluidine | 3.2 |
| 5 sodium sulphanilite | 4.5 |
| 5 sulphonated castor oil and 5 sodium salicylate | 6 |
| 5 thiourea | 7.75 |
| 5 sodium salicylate | 9 |
| 5 ammonium linolenate and iso-linolenate | 13 |
| 5 saponin | 16 |
| 5 sodium dioxynaphthalene disulphonate | 22 |
| 5 potassium oleate | 25 |
| 5 sodium naphthalene sulphonate | 58 |
| (Alone) | 60 |
| 5 sulphanilic acid | 120 |
| 5 tannin | 150 |
| 5 urea nitrate (CP) | 150 |

Filling and/or vulcanizing ingredients and/or accelerators may be incorporated as desired in quantities which may be left to the discretion of the manufacturer. It may be found desirable to combine the penetrating feature of the present invention in other compositions or combinations of latex, such for instance as adhesive compositions, and this invention is not to be understood as limited per se to the specific compositions above set forth by way of illustration, the intention being to comprehend any and all compositions in which the rate of penetration of water repellent materials or associations thereof is governed or controlled by the deliberate incorporation of an agent or agents for wetting the materials and paving the way for an aqueous dispersion of rubber, with or without other ingredients, to pass more or less thereinto, and whether the penetrating agent be applied before or simultaneously with the rubber latex or its equivalents.

Of course the product of this invention may be additionally treated with rubber or rubber substances according to known practices for various specific ends or purposes. For instance fibrous material treated according to this invention may have an additional skim coat applied thereto. Or an impregnated base material may have an additional body of rubber composition built thereupon.

As stated above, the invention is suitable for application to water repellent fibres or to associations of water repellent fibres. As a specific example of the application of the invention to jute rope cord or fabric, a compound such as 100 parts of rubber as latex or an aqueous dispersion of rubber containing 15% solids, 2 parts sulphonated castor oil and 50 parts gilder's whiting may be employed. The cord or rope is passed through the compound and then dried and polished. If desired the concentration of the rubber dispersion may be varied to give differing amounts of rubber in the cord. The rate and extent of penetration depends upon the proportion of polar compound used and upon the time the rope is permitted to stay in the rubber dispersion. The polar compound may be replaced by other materials such as are mentioned above. A jute cord of about ¼" diameter after impregnation showed an increase of about 20% in tensile strength. Another similar cord showed approximately 18% improvement in tensile strength and approximately 76% improvement in resistance to wear.

The invention may be applied to carpet, such as the carpet made from rags, grass, vegetable fibres or wool or mixtures of these. It is often quite essential that penetration of the rubber dispersion takes place and to accomplish this polar compounds have given satisfactory results. A suitable composition is:

Parts
100 rubber as latex containing 12.5 solids
50 gilder's whiting
20 sulphonated castor oil As indicated in the above formulæ latex or dispersed rubber can be used in varying degrees of dilution. The sulphonated castor oil can be varied in amount or partially or completely replaced by other soluble oils or other penetrating agents such as indicated above. Compounding ingredients such as gilder's whiting or other inert materials can be used in varying amounts. Stabilizing, thickening or hardening agents such as for example sodium silicate, glue, starch, dextrine, and the like may be used where desired. Coloring agents or vulcanizing ingredients may likewise be used in the dispersion and deposited in and/or on the carpet.

Cotton rope, cord, hose or belting may also be treated with rubber dispersions according to the present invention. Such associations of fibres may be impregnated in their entirety or in the case of rope may have the central cord impregnated before the surrounding cords are braided on the central cord, and a second impregnation given the outer braided portion. The same applies to belting. It is possible to obtain increases in resistance to flexing or abrasion amounting to as much as 300% by impregnating with a rubber dispersion containing a polar compound. Depending upon the thickness and tightness of the cord or belting and upon the nature and amount of the polar compound, increases in abrasion resistance ranging from 50 to 300% may be obtained without causing much more than a 10% reduction in the number of feet of the cord or belt per pound. It is of course possible to include vulcanizing ingredients or combinations in the rubber dispersions mentioned above.

The invention may also be applied to associations of fibres such as paper, and for example the highly calendered papers which are difficult to impregnate. Or the invention may be applied also to low grade paper stocks or paper stocks containing fibrous or filling materials which are difficult to penetrate with rubber dispersions. The use of a polar compound or wetting agent in the rubber dispersion makes it possible to penetrate such paper stocks. As specific instances, cheap paper felt may be treated with the compositions set forth in this invention to form floor coverings. Hard calendered and highly embossed or crinkled papers such as those used as bag and barrel linings may be treated with rubber dispersions containing polar compounds yielding a highly satisfactory waterproof coating which adheres very firmly to the paper surface due to the fact that it is in intimate contact with or has penetrated into the fibrous association.

These rubber dispersions, by varying the polar agent used and by including filler materials when desirable, may also be employed as top sizing for paper and other sheet materials.

To illustrate the application of the polar compound to materials which are not necessarily penetrated, in which instance the polar compound acts more as a wetting agent, the application of rubber dispersions containing polar compounds to stone surfaces is mentioned. Taking for example a concrete, the surface of which has not been finished with neat cement, a rubber dispersion containing a polar compound may be spread thereupon or otherwise placed in contact therewith and allowed to dry. It will be found that the rubber coating thus laid upon the concrete will have a much higher degree of adhesion to the concrete than an ordinary rubber dispersion which does not contain a polar compound or wetting agent. The same holds true for crushed stone such as the granites, limestones, slags, and other stones or powdered materials whose surface is inclined to be granular. The adhesion of rubber compound to such granular surfaces increases directly with the degree of wetting.

Other non-fibrous water repellent materials may be similarly treated. For example cork and other such woody products, and even wood itself may be treated with rubber dispersions containing polar compounds, the result being that the rubber dispersion after drying will be tightly adherent to the material by virtue of the fact that penetration and/or thorough wetting has taken place.

In the specification and claims the terms "wetting agent" or "polar compound" is employed to comprehend those substances generally organic substances which possess a gradation of properties within the molecule different sections of which have appreciably different properties such as solubility, or affinity for other substances and particularly a capacity to wet water repellent materials. These terms "wetting agent" or "polar compound" include those substances which show relatively low interfacial tension toward both water resistant materials on one hand and water on the other. In still other words, these terms include those substances each molecule of which is composed essentially of two parts, viz., a hydrocarbon, which has a strong attraction for and is miscible with oils, greases, and waxes, and which also is relatively non-polar, and an active group or groups of atoms which has a strong attraction for water. Practically all of the wetting agents or polar compounds previously mentioned are organic substances whose properties are sufficiently modified by the active polar group or groups so as to make them miscible in water. Similarly, relatively water-insoluble organic compounds possessing the above-described properties may be used as emulsions in the rubber compounds or applied directly to the water repellent substances.

It is believed that by this invention it has now been made practical to manufacture commercially a wide variety of rubberized articles or materials having an association of water-repellent fillers or fibres constituting the whole or a part thereof, and this invention is regarded as basic in character. Reference should be made to the accompanying claims for an understanding of the scope of the invention.

The term "water repellent material" in the appended claims is intended to include those materials which are not readily wet by water or by an aqueous dispersion of rubber, such materials including concrete, wood, stone, cork, and similar materials which have a granular surface or a greasy or oily surface which is not readily wet by water. In certain of the claims the term water repellent fibrous materials is employed to signify such cotton, hemp, jute, wool, asbestos, sisal, flax, and other fibres which possess the characteristics of being water repellent to a varying degree. The term "fibrous material" is also meant to include those fibres and associations of fibres such as cords, ropes, felts, sheets, manufactured articles such as carpet, bagging, hose, belting, paper, cardboard, pressed articles made from ground wood fibres, and in general all manufactured articles which are made of materials resistant to the ingress of or wetting with water.

Having thus described my invention, what I claim and desire to protect by Letters Patent is:

1. A process for treating water repellent material which comprises preliminarily applying to said material a sulphonated organic polar compound, and then allowing rubber in the form of an aqueous dispersion of rubber to enter into intimate contact with said material.

2. A process for treating water repellent material which comprises preliminarily applying to said material a sulphonated organic polar compound, and then allowing rubber in the form of an aqueous dispersion of rubber containing vulcanizing ingredients to enter into intimate contact with said material.

3. A process for treating water repellent fibrous material which comprises preliminarily applying to said material a sulphonated organic polar compound, and then allowing rubber in the form of an aqueous dispersion of rubber to enter into intimate association with the fibres of said material.

4. A process for treating water repellent fibrous material which comprises preliminarily applying to said material a sulphonated organic polar compound, and then allowing rubber in the form of an aqueous dispersion of rubber containing vulcanizing ingredients to enter into intimate association with the fibres of said material.

5. A process for treating water repellent material which comprises preliminarily applying to said material sulphonated castor oil, and then allowing rubber in the form of an aqueous dispersion of rubber to enter into intimate contact with said material.

6. A process for treating water repellent material which comprises preliminarily applying to said material sulphonated castor oil, and then allowing rubber in the form of an aqueous dispersion of rubber containing vulcanizing ingredients to enter into intimate contact with said material.

7. A process for treating water repellent fibrous material which comprises preliminarily applying to said material sulphonated castor oil, and then allowing rubber in the form of an aqueous dispersion of rubber to enter into intimate association with the fibres of said material.

8. A process for treating water repellent fibrous material which comprises preliminarily applying to said material sulphonated castor oil, and then allowing rubber in the form of an aqueous dispersion of rubber containing vulcanizing ingredients to enter into intimate association with the fibres of said material.

9. A process for rubberizing water repellent material which comprises preliminarily treating said material with a wetting agent, treating said material with an aqueous dispersion of rubber, and drying.

10. A process for rubberizing water repellent material which comprises preliminarily treating said material with material from the group comprising sulphonated castor oil, sulphonated cotton seed oil, sulphonated olive oil, sulphonated arachis oil, ortho toluidine, sodium sulphanilite, thiourea, sodium salicylate, ammonium linolenate and isolinolenate, saponin, sodium dioxynaphthalene disulphonate, potassium oleate, and sodium naphthalene sulphonate, treating said material with an aqueous dispersion of rubber, and drying.

11. A process for rubberizing water repellent material which comprises preliminarily treating said material with a sulphonated oil, treating said material with an aqueous dispersion of rubber, and drying.

12. As an article of manufacture, a water repellent fibrous material impregnated with material from the group comprising sulphonated castor oil, sulphonated cotton seed oil, sulphonated olive oil, sulphonated arachis oil, ortho toluidine, sodium sulphanilite, thiourea, sodium salicylate, ammonium linolenate and isolinolenate, saponin, sodium dioxynaphthalene disulphonate, potassium oleate, and sodium naphthalene sulphonate, and the solids deposit of an aqueous dispersion of rubber.

13. As an article of manufacture, a water repellent fibrous material impregnated with a wetting agent, and the solids deposit of an aqueous dispersion of rubber.

14. As an article of manufacture, a water repellent fibrous material impregnated with a sulphonated oil, and the solids deposit of an aqueous dispersion of rubber.

Signed at New York, county and State of New York, this 16 day of August, 1927.

MERWYN C. TEAGUE.